Sept. 23, 1952     A. R. RODACKER     2,611,250
FOOD MOLDING DEVICE
Filed April 26, 1949
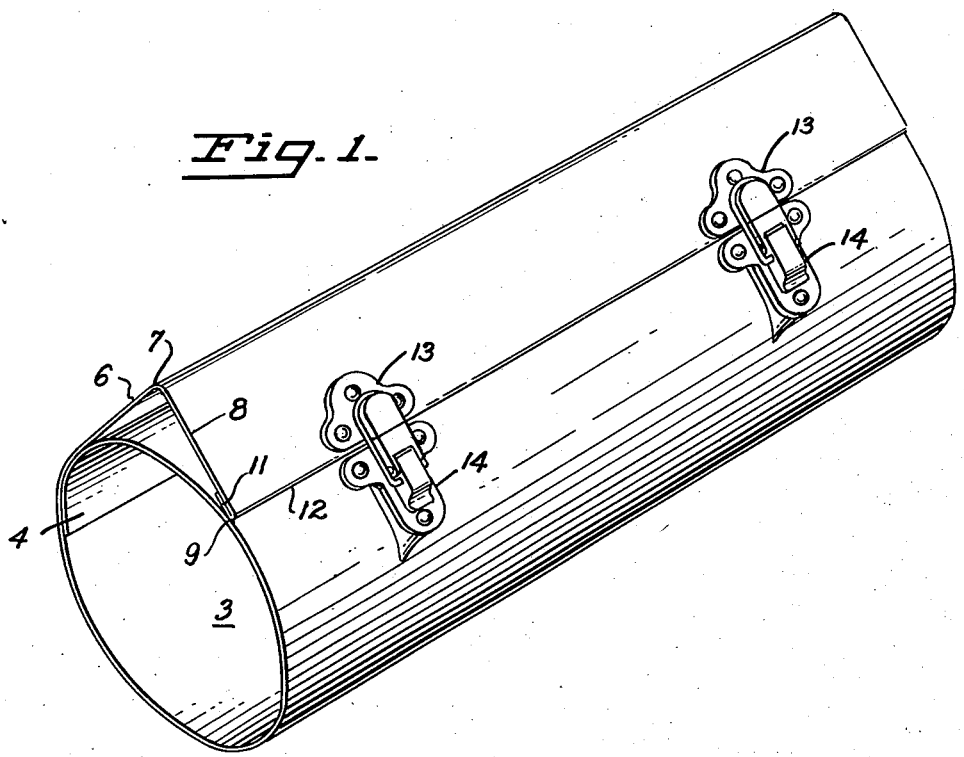
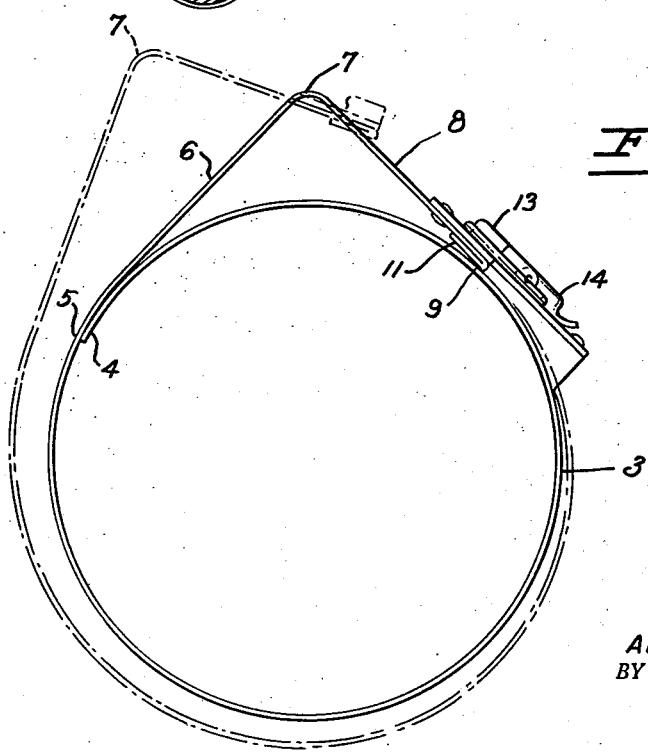
INVENTOR.
ALBERT R. RODACKER
BY *Stephen S. Townsend*
ATTORNEY Patented Sept. 23, 1952

2,611,250

UNITED STATES PATENT OFFICE 2,611,250

FOOD MOLDING DEVICE

Albert R. Rodacker, Chico, Calif.

Application April 26, 1949, Serial No. 89,704

7 Claims. (Cl. 62—1)

1

This invention relates to an improved food molding device and more particularly relates to a molding sleeve which is especially adapted for use in molding food products, such as chopped meats, in frozen form.

The particular embodiment of my invention is illustrated in the drawings and which will be described hereinafter in more detail comprises, generally, a sheet formed of a spring material, such as spring metal or the like, and which is coiled to form an open-ended cylinder portion. The outermost coil of the sheet material is extended from the cylinder forming portion and at a point removed from the cylinder. This extended portion is bent at an angle reentrant with respect to the cylinder to form a spring closure portion. The end of this latter portion or element, in turn, contacts the outer surface of the cylinder, and fastening means are provided to removably secure or lock the said end to the said cylinder forming portion of the sheet. As will be fully explained hereinafter the cylinder forming portion of the sheet is adapted to serve as a mold for freezing food products packed therein.

Chopped or ground meat patties (popularly known as "hamburgers") constitute a food item which is sold in most restaurants and lunch counters and which is consumed in large quantities in private homes and kitchens. The most frequent way of preparing the patties for cooking is by merely hand-shaping chunks of the ground beef to form rather flat and thin patties. This method has been found unsatisfactory in that the patties so formed contain different quantities of meat and are for the most part not uniform or regular in shape. Moreover, a single batch of meat patties which are formed by hand in the manner indicated above may vary considerably not only in their respective diameters but in their respective thicknesses as well.

By providing a cylindrical molding sleeve of the type hereinabove indicated chopped meat may be firmly packed within the sleeve and frozen solid therein, and after freezing the food may be removed in the shape of a solid cylindrical chunk. The frozen chopped meat is of a sufficient hardness to permit round discs or patties of meat of uniform diameter and thickness, to be sawed therefrom slice-by-slice.

A principal object of the present invention, therefore, is to provide a food molding sleeve of the type heretofore mentioned whereby food, such as chopped meat, may be firmly packed therein and frozen, and after freezing operations easily removed from the said molding sleeve and sliced into patties of uniform dimensions and

2 which all contain substantially the same food content.

Another object of the present invention is to provide a molding device of the character above indicated which, though extremely simple in construction and formed from one integral sheet of relatively thin material, is so designed that it will retain its cylindrical shape and not become deformed even after it has been used many times.

Other objects of the present invention are to provide a food molding device which may be manufactured relatively inexpensively and which is extremely simple to operate.

Further objects of the present invention will become apparent upon reading the following specification and referring to the accompanying drawings in which similar characters of reference represent corresponding parts in each of the several views.

In the drawings:

Fig. 1 is a perspective view of the invention.

Fig. 2 is an end elevational view of same.

Referring now more specifically to the drawings, the present device comprises an elongated sheet 3 of spring material. Preferably sheet 3 is formed of a spring metal, such as spring steel, in view of the fact that metal has not only the desired qualities of resiliency and springiness, but is an excellent conductor of heat. Thus, food packed within the device may be exposed very rapidly to freezing temperatures and there is no practical disadvantage that the heat insulating properties of the material will impede the desired quick freezing of the food.

More specifically sheet 3 comprises an end 4 which is coiled circularly around itself to underlie another part or portion of sheet 3 which is indicated at 5. It is noted that the portion of the sheet between end 4 and portion 5 comprises or defines a substantially round hollow cylinder or sleeve, which occasionally hereinafter will be referred to as the cylinder forming portion of the sheet or merely as the cylinder.

Portion 5 of the sheet forms the outer coil of the cylinder, and extending outwardly therefrom and forming a continuation thereof is a flat plane surface 6 which is disposed along a line drawn substantially tangential to the curvature of the cylinder at point 5. A bend 7 is formed in surface 6 at a point therealong removed from the cylinder forming portion of said sheet, and a second flat plane surface 8 extends therebeyond. Preferably bend 7 defines a right angle, and it is noted that the angle of the bend is reentrant with respect to the cylinder forming portion of the sheet. More specifically, the end of flat plane surface 8 is preferably doubled over itself to form a casing 11 (to provide rigidity to the member) and edge 12 thereof contacts the cylinder forming portion of the sheet at point 9. The line along which flat plane surface 8 approaches point 9 of the cylinder forming portion of the sheet is substantially tangential to the curvature of the cylinder at the said point 9.

A plurality of complementary buckling elements 13 and 14 are secured by suitable respectively means to surface 8 adjacent edge 12 thereof, and to the cylinder forming portion of the sheet adjacent point 9 thereof. Preferably, I prefer to employ toggle mechanism type fasteners, such as are conventionally employed on luggage pieces of various kinds.

Portions 6, 7 and 8 of the sheet 3, which have been identified heretofore, function together as a spring closure portion for the present device. More particularly bend 7 is preferably a soft bend—i. e., it is not formed sharply or abruptly but is substantially curved or rounded. Normally, the spring action exerted by elements 6, 7 and 8 serve to tension the buckle elements 13 and 14 away from one another which insures fast engagement between said fastening elements. Moreover, spring tensioning elements 6, 7 and 8 exert a spring pressure along the length of the cylinder but at the same time establish a sufficient amount or degree of resiliency or elastic give in the cylinder forming portion of the device to permit the latter to expand or contract to a certain extent during packing and handling operations. Thus any practical danger of the cylinder being permanently deformed or misshaped during normal operations is largely eliminated.

In operation, the device is assembled in the manner indicated in the drawings wherein it is seen that the various portions of sheet 3 are locked or maintained in their relative operative positions with respect to one another by action of the fastening elements 13 and 14. Assuming elements 13 and 14 to be in locked or fastened engagement with one another, the food, such as chopped meat (not shown) to be molded in frozen form, is firmly packed into one of the open ends of the cylinder while the other end of the cylinder is positioned or stood upon a table or other flat surface to establish a closure therefor and to prevent the food from extruding outwardly therefrom during packing operations. After the meat has been firmly packed into the cylinder, the device may be placed in a refrigeration box or freezing room and there subjected to freezing temperatures. After the food has frozen solid all the way through, it may be removed from the device in its solid frozen cylindrical form by unfastening the elements 13 and 14 to permit sheet 3 to uncoil and open up. More particularly the inherent spring quality of the material out of which sheet 3 is formed plus the action of the spring tensioning portions 6, 7 and 8 of the sheet causes the cylinder forming portion of the sheet to spring open very rapidly. This action is advantageous in that frozen particles of food which tend to adhere to the inner walls of the cylinder are to a large extent broken loose therefrom by the snap-spring opening action. Fig. 2 illustrates in broken lines the uncoiling action of sheet 3 which takes place upon release of locking elements 13 and 14. If the rapid spring-action opening of the cylinder does not effect a breaking loose of all the frozen food particles adhering thereto, an operator need then only apply heat (such as warm water) to the external cylinder walls to melt the frozen particles and permit easy removal of the frozen food from said cylinder.

I have found that provision of spring tensioning elements 6, 7 and 8 greatly facilitates the fastening and unfastening of elements 13 and 14. For example, during either fastening or unfastening operations, an operator need only press down with his hand against the soft bend 7 to move edge 12 of the material as near as possible to fastening element 14 to thereby permit easy operation of the toggle mechanism comprising said element 14.

Although I have described my invention in some detail by way of illustration and example for purposes of clarity of understanding, it is understood that certain changes and modifications may be made within the spirit of the invention and scope of the appended claims.

I claim:

1. A food molding device comprising, an elongated sheet of coiled spring material forming an open-ended cylinder, the outermost coil of said sheet extended from said cylinder and formed with a bend at an angle reentrant with respect to said cylinder to contact said cylinder tangentially of the outer surface thereof, and interlocking members associated with said extended portion and the body of said cylinder to lock removably the end of said extended portion of said sheet to the cylinder.

2. A food molding device according to claim 1 and wherein said elongated sheet of spring material comprises a single coiled sheet forming a cylinder having a substantially single thickness wall structure.

3. A food molding device comprising, an elongated sheet of spring material comprising a cylinder forming portion and a spring closure portion, the cylinder forming portion comprising a coil of said sheet forming an elongated open-ended cylinder, the spring closure portion comprising one end of said sheet being extended tangentially from said cylinder and formed with a bend defining a surface extending back toward said cylinder contacting the same tangentially thereof, the angle of the bend being substantially more than 45° and less than 180°, and interlocking members associated with said surface defined by said bend and the body of said cylinder locking removably said closure portion to said cylinder exerting pressure against said cylinder throughout the length thereof, said spring closure portion arranged to spring away from lengthwise pressure contact with said cylinder upon release of said lock means.

4. A food molding device according to claim 1 and wherein the angle of said bend is substantially 90°.

5. A food molding device according to claim 1 and wherein said bend is a soft bend formed in said spring material.

6. A food molding device comprising, an elongated sheet of spring material comprising a cylinder forming portion and a spring closure portion, said cylinder forming portion comprising a single coil of said sheet forming an elongated open-ended cylinder, said spring closure portion comprising one end of said sheet being extended tangentially from said cylinder and formed with a bend defining a surface extending back toward said cylinder contacting same along a line tangential to the curvature of said cylinder at said point of contact, the angle of said bend measuring approximately 90°, complementary fastening elements provided on said spring closure portion and said cylinder forming portion respectively to lock removably said portions together, said spring closure portion arranged to exert pressure against said cylinder throughout the length thereof when said fastening elements are locked together and to spring away from lengthwise pressure contact with said cylinder upon release of said fastening elements.

7. A food molding device according to claim 6 and wherein said bend is a soft bend formed in said spring material.

ALBERT R. RODACKER.

REFERENCES CITED

The following references are of record in the file of this patent:

UNITED STATES PATENTS

| Number | Name | Date |
| --- | --- | --- |
| 645,780 | Bennett | Mar. 20, 1900 |
| 971,263 | Gilmore | Sept. 27, 1910 |
| 1,139,550 | McCracken | May 18, 1915 |
| 1,182,040 | Ritthamer | May 9, 1916 |
| 2,335,464 | Tinnerman | Nov. 30, 1943 |

FOREIGN PATENTS

| Number | Country | Date |
| --- | --- | --- |
| 739,338 | France | Oct. 25, 1932 |